United States Patent [19]

Hurst et al.

[11] Patent Number: 4,789,995

[45] Date of Patent: Dec. 6, 1988

[54] SYNCHRONOUS TIMER ANTI-ALIAS FILTER AND GAIN STAGE

[75] Inventor: Paul Hurst, Yolo; Thomas Glad, Grass Valley/both of Calif.

[73] Assignee: Silicon Systems Inc., Tustin, Calif.

[21] Appl. No.: 45,034

[22] Filed: May 1, 1987

[51] Int. Cl.[4] .............................................. H04L 27/06
[52] U.S. Cl. ........................................ 375/75; 375/96; 364/724.01
[58] Field of Search ............... 375/75, 96; 364/724; 358/37; 370/84

[56] References Cited

U.S. PATENT DOCUMENTS

| | | | |
|---|---|---|---|
| 4,652,908 | 3/1987 | Fling et al. | 358/183 |
| 4,656,515 | 4/1987 | Christopher | 358/22 |
| 4,686,655 | 8/1987 | Hyatt | 364/72 X |
| 4,703,447 | 10/1987 | Lake, Jr. | 364/72 X |

Primary Examiner—Robert L. Griffin
Assistant Examiner—Stephen Chin
Attorney, Agent, or Firm—Hecker & Harriman

[57] ABSTRACT

A synchronous timer anti-alias filter gain stage utilizing switched capacitor circuitry is described. A high frequency sampling clock is used for a switched capacitor anti-alias filter. In the preferred embodiment, a clock of approximately 921.6 kilohertz is utilized. This fast clock is divided down by a programmable timer into a low frequency sampling clock to drive a signal gain stage. The programmable divide values are integers so that the anti-alias filter clock and gain stage clock are in an integer relationship with each other for edge locking. The high frequency clock is divided down by a fixed divider to provide a clocking signal to an input band pass filter. The fixed divide value is also an integer so that the band pass filter clock and anti-alias filter clock are in integer relationship with each other. Switched capacitor anti-alias filters are used in place of continuous time, R-C anti-alias filters. The switched capacitor anti-alias filter has greater accuracy than R-C filters, approaching the range of 0.2% accuracy of the time constant. In addition, the switched capacitor anti-alias filter requires less silicon area than equivalent R-C filters in integrated cirucit implementations. DC offsets are eliminated by preceding and following the gain stage by first order high pass filters. The programmability of the low frequency sampling clock rate, by changing the divide values, allows the received baud rate to be tracked in modem applications.

17 Claims, 1 Drawing Sheet

SYNCHRONOUS TIMER ANTI-ALIAS FILTER AND GAIN STAGE

BACKGROUND OF THE INVENTION

1. FIELD OF THE INVENTION

This invention relates to the field of programmable clocks to be used in demodulating receiving channels.

2. BACKGROUND ART

With the increased popularity of computers and data processing systems, the need for communication between computers and data bases has increased. A popular tool for implementing communication between computers is the modem, which allows communication over telephone lines of data in serial form. Modem is short for "modulator/demodulator".

Raw data signals, also known as "base band" signals, are inappropriate for transmission at high speed. In order to efficiently transmit the data over, for example, phone lines, it is first modulated to a higher frequency by using the data signal itself to modulate a carrier wave. For example, phase shift key (PSK) and quadrature amplitude modulation (QAM) schemes are typically used as a way of transmitting data at high frequencies.

Correspondingly, when the modulated data is received by another modem, it must be demodulated, that is, the carrier must be removed, leaving the data signal.

When data is received by a modem, it is filtered and amplified as necessary prior to being sampled and converted to a digital signal. There is a certain amount of noise associated with phone line transmission. This noise, although not necessarily at the sampling frequency, may cause aliases to appear, resulting in data compromise or loss. In order to eliminate the noise, anti-alias filters are utilized.

In the prior art, anti-aliasing filters have typically been implemented through continuous time, resistor-capacitor (R-C) circuitry. However, such R-C anti-alias filters have a poor time constant tolerance which may be as large as plus or minus 50%. In addition, a large silicon area is required when implementing R-C filters in integrated circuit format.

In order to facilitate anti-aliasing, it is desired to sample data with a high frequency clock. However, subsequent switched-capacitor stages require low sampling rates to minimize silicon area and to reduce the processing rate required in the following demodulating stages.

In the prior art, the low frequency sampling signals were provided by programmable timers on digital signal processors or with costly external logic. Therefore, it is desired to provide a low cost independent programmable timer associated with anti-alias filters and the gain stage of modem receivers.

It is another object of the present invention to provide an accurate anti-aliasing filter with a close tolerance time constant.

It is yet another object of the present invention to provide an anti-alias filter which consumes very little silicon area in integrated circuit applications.

SUMMARY OF THE PRESENT INVENTION

A synchronous timer anti-alias filter gain stage utilizing switched capacitor circuitry is described. A high frequency sampling clock is inputted to a switched capacitor anti-alias filter. In the preferred embodiment, a clock of approximatley 921.6 kilohertz is utilized. This fast clock is divided down by a programmable timer into a low frequency sampling clock to drive a signal gain stage. The fast clock signal is also divided down at a fixed rate to provide a clocking signal to a band pass filter. The band pass filter and anti-alias filter clocks thus always have an integer relationship with each other for synchronization. The clock input to the gain stage, depending on the programmed divide down of the high frequency clock, is asynchronous with the band pass filter. However, the gain stage is always in an integer relationship with the anti-alias filter so that edge synchronization is achieved between the anti-alias filter and gain stage. In this manner, a low cost programmable clock may be implemented with an anti-alias filter/gain stage. Switched capacitor anti-alias filters are used in place of continuous time, R-C anti-alias filters. The switched capacitor anti-alias filter has greater accuracy than R-C filters, approaching the range of 0.2% accuracy of the time constant. In addition, the switched capacitor anti-alias filter requires less silicon area than equivalent R-C filters in integrated circuit implementations. DC offsets are eliminated by preceding and following the gain stage by first order high pass filters. The programmability of the low frequency sampling clock rate, by changing the divide values, allows the received baud rate to be tracked.

DETAILED DESCRIPTION OF THE PRESENT INVENTION

A receive channel with a programmable timer is described. In the following description, numerous specific details, such as frequency, divide ratios, gain, etc. are set forth to provide a more thorough understanding of the present invention. It will be obvious, however, to those skilled in the art, that the present invention may be practiced without these specific details. In other instances, well known circuits and features have not been described in detail in order not to unnecessarily obscure the present invention.

Figure 1:
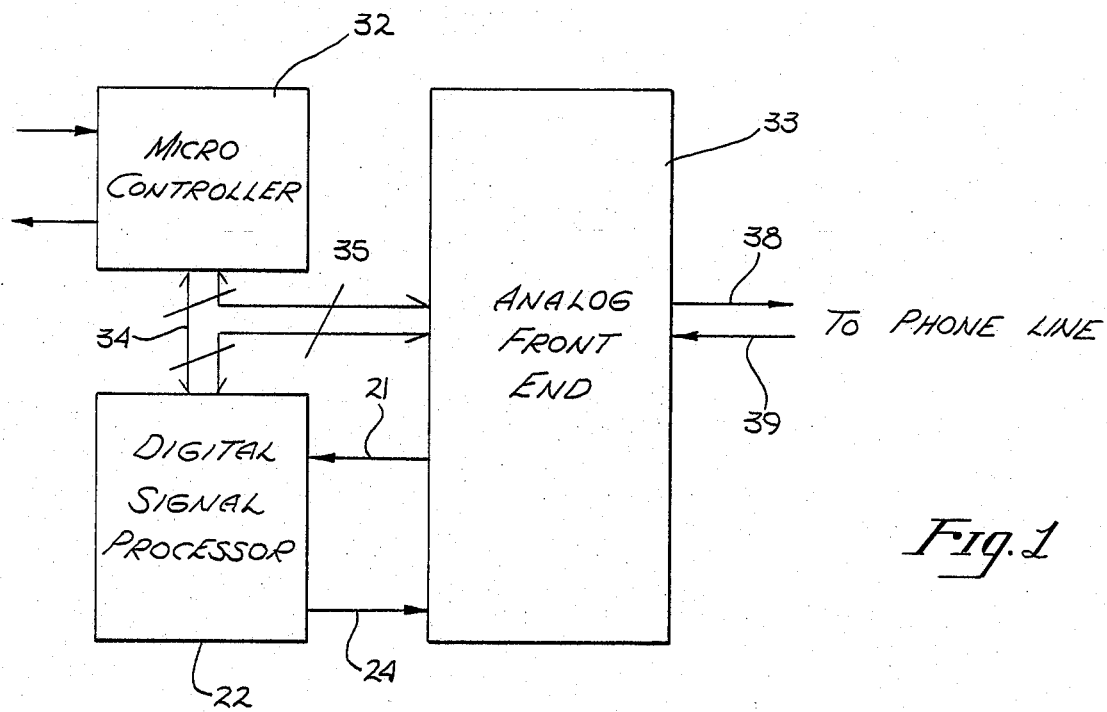
FIG. 1 is a block diagram of a modem architecture.

Referring to FIG. 1, a block diagram of a modem such as may be used with the present invention is illustrated. The modem is implemented with three separate functional blocks, a microcontroller 32, a digital signal processor (DSP) 22 and an analog front end (AFE) 33. The digital signal processor 22 is coupled to the microcontroller 32 on bus 34. Both the microcontroller 32 and DSP 22 are coupled to AFE 33 through bus 35. In addition, the DSP outputs gain control signals and timing control signals on line 24 to AFE 33. Digital output signals are coupled to DSP 22 on line 21. The raw data is inputted to microcontroller 32 on line 36. Received data, after being converted to digital form, is outputted by microcontroller 32 on line 37. The modem outputs modulated data suitable for transmission on line 38 and receives modulated transmission signals on line 39.

In the embodiment illustrated in FIG. 1, the DSP 22 is used for receive signal demodulation, gain and timing recovery control, phase splitting, adaptive equalizing, carrier recovery and slicing. The microcontroller 32 controls the AFE 33 and DSP 22, handles the data interface to the data source (e.g. terminal or converter), interprets modem commands and handles supervision and error detection.

The AFE 33 is an application specific signal processing stage and includes substantial portions of the transmit channel and pass band processing for the received channel.

As noted previously, in order to improve the efficiency of anti-aliasing filters, it is desired to sample the data at a high frequency so that out of band noise sources may be attenuated and removed from the received signal with the aliasing. In addition, it is desired to provide a low cost programmable clock which can drive subsequent gain stages at lower frequency rates. A large number of low cost digital processors exist suitable for use as microcontroller 32 and DSP 22. These low cost processors do not include programmable clocks. Higher cost processors may implement programmable clocks but such require dedication of code space and silicon area. The present invention allows implementation of a programmable clock on AFE 33 so that low cost processors may be utilized as microcontroller 32 and DSP 22.

Figure 2:
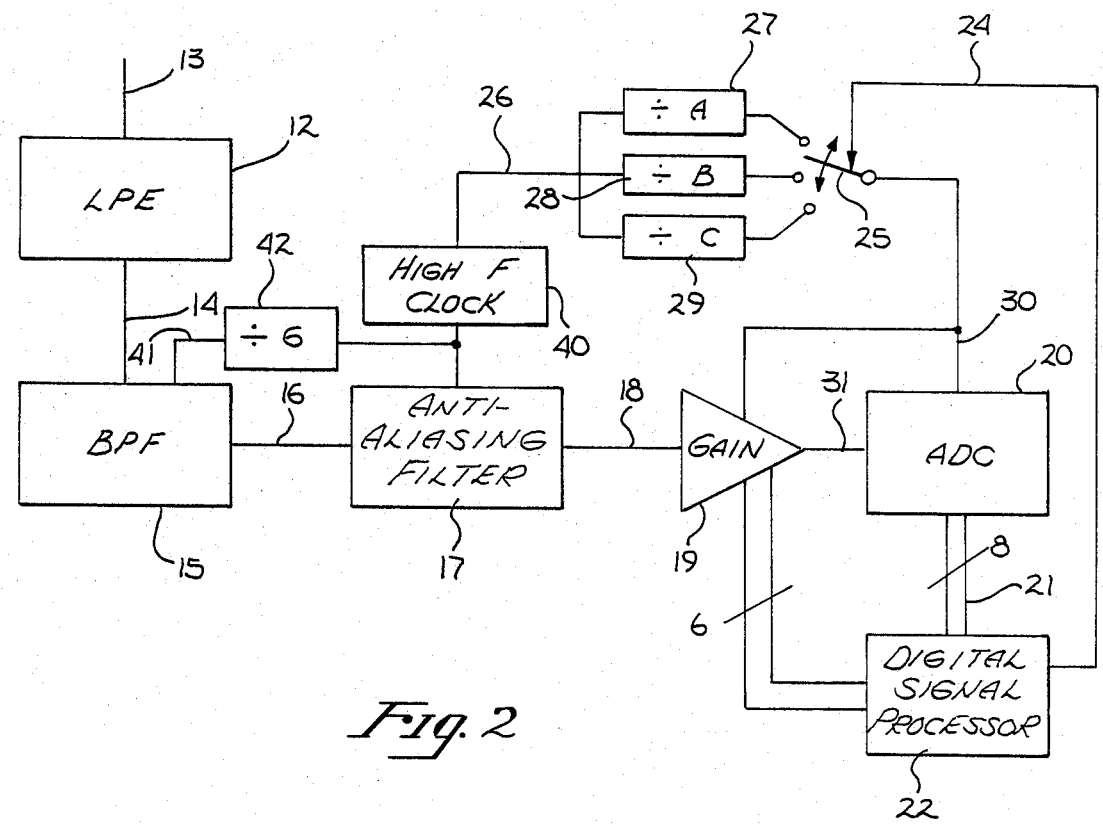
FIG. 2 is a block diagram illustrating the preferred embodiment of the present invention.

Referring to FIG. 2, a block diagram illustrating the preferred embodiment of the present invention is illustrated. The received data signal 13 is inputted to low pass filter (LPF) 12. The output 14 of LPF 12 is inputted to band pass filter (BPF) 15. The output 16 of BPF 15 is inputted to anti-aliasing filter (AAF) 17, whose output 18 is inputted to gain stage 19.

The output 31 of gain stage 19 is inputted to analog to digital converter (ADC) 20. The output 21 of ADC 20 is inputted to digital signal processor (DSP) 22.

Digital signal processor 22 outputs a gain control signal 23 to gain stage 19. DSP 22 also outputs a clock control signal 24 to switch 25. Switch 25 is a three way switch which may be selectively coupled to divide A 27, divide B 28, or divide C 29. The input to dividers 27-29 is the output on line 26 of high frequency clock 40. Clock 40 provides the clocking signal to AAF 17. As previously noted, AAF 17 is sampled at a relatively high frequency (e.g. 921.6 kilohertz in the preferred embodiment) for more efficient anti-aliasing. High frequency clock 40 is also coupled through divider 42. Divider 42 outputs clock signal 41 to band pass filter 15. In the preferred embodiment, divider 42 divides the high frequency clock 40 by 6.

In operation, the data signal 13 is inputted to low pass filter 12 to attenuate noise which may cause aliasing problems. The output 14 of LPF 12 is inputted to BPF 15 to eliminate the local transmitted signal in adjacent frequency bands and provide compromise magnitude and phase equalization for a typical transmission line.

The band limited output 16 of BPF 15 is inputted to AAF 17 for further anti-aliasing. In the preferred embodiment of the present invention, AAF 17 is a second order low pass filter with a pass band equal to 3 KHz with 0.1 dB ripple. It will be obvious, however, that any suitable AAF may be utilized without departing from the scope of the present invention.

The output of AAF 17 is coupled to programmable gain stage 19. The gain of gain stage 19 is controlled by DSP 22. A control signal 23 generated by DSP 22 is inputted to gain stage 19 to control the gain. In the preferred embodiment of the present invention, the gain range of gain stage 19 is zero to 48 dB in 0.375 dB steps.

After amplification, the amplified signal 31 is inputted to ADC 20 and, in the preferred embodiment, converted to an 8 bit 2's complement for serial transmission to the DSP 22.

High frequency clock 40 provides a sample clock to AAF 17. As previously noted, the high sample frequency aids in eliminating aliasing problems. The clock 40 is coupled on line 26 to dividers 27-29. In the preferred embodiment, dividers 27, 28 and 29 divide by 97, 96 and 95 respectively to provide a nominal 9.6 KHz sampling clock which drives the gain stage. In an alternate embodiment, a 7.2 KHz clock is provided by setting divider values of 129, 128 and 127.

The programmable clock of the present invention is implemented by the dividers 27-29 and clock 40. The divide values of dividers 27-29 are always chosen to be integer values. In this manner, high frequency clock 40 inputted to AAF 17 is always in an integer relationship with the clock signal output of the divider stage to clock gain stage 19 and ADC 20. However, not all of the divide values of dividers 27-29 are in an integer relationship with the divide by 6 value of divider 42. Correspondingly, the clock driving BPF 15 is asynchronous with the clock signal driving the gain stage 19 and ADC 20. However, the clock signal of BPF 15 and the clock signal of AAF 17 are always in an integer relationship with each other. (High frequency clock 40 is divided by an integer, 6, to generate the clock to BPF 15). Thus, the sampling of AAF 17 is always edge locked with the output of BPF 15.

Further, the clock signals of AAF 17 and gain stage 19 are always integer related. This is because, regardless of which of dividers 27-29 is selected, each divides high frequency clock 40 by an integer value. Thus, gain stage 19 is always edge locked with the valid 921.6 kHz samples of AAF 17. Thus, even though clocking of BPF 15 and gain stage 19 is asynchronous, the circuit of the present invention prevents synchronization problems.

The programmability of the clock 40 aids in timing recovery allowing the sampling rate of the gain stage to be adjusted to the incoming bit rate clock. The control signal 24 from DSP 22 is used to select one of dividers 27-29 to track the baud clock of the received signal. Although not described in detail, the DSP 22 is part of a phase locked loop implementing a timing recovery algorithm which uses the dividers 27-29 for tracking the recovered baud rate.

By utilizing a low sampling rate in gain stage 19, large unit capacitor ratios may be employed in the gain stage 19 (due to relaxed settling requirements). Utilizing large unit capacitors in the gain stage 19 results in a low input offset signal to the gain stage. In this manner, clipping at the maximum gain setting of the gain stage 19 is avoided.

Thus, a low cost, effective receive timing scheme has been described.

I claim:

1. A circuit for receiving and demodulating a data signal, said circuit comprising:
    clock signal generating means for providing a clock at a first frequency;
    first clock dividing means coupled to said clock signal generating means for dividing said first clock signal by a first divide value, said first clock dividing means outputting a second clock signal having an integer relationship to said first clock signal;
    first filter means coupled to said data signal and to said second clock signal, said first filter means outputting a second data signal;
    second filter means coupled to said second data signal, said second filter means being an anti-aliasing filter (AAF), said AAF coupled to said first clock signal, said second filter means outputting a third data signal;

gain stage means coupled to said third data signal, said gain stage means for amplifying said third data signal and outputting a fourth data signal;

second clock dividing means coupled to said first clock signal for selectively dividing said first clock signal by one of a plurality of second divide values, said second dividing means outputting a third clock signal coupled to said gain stage means, said second clock signal asynchronous with said third clock signal, said third clock signal in an integer relationship with said first clock signal;

control means coupled to said clock dividing means, said control means selecting said second one of said plurality of second divide values dependent on an amount of jitter in said data signal.

2. The circuit of claim 1 wherein said first filter means comprises a band pass filter (BPF).

3. The circuit of claim 2 wherein said AAF comprises a switched capacitor anti-alias filter.

4. The circuit of claim 3 wherein said first divide value is 6.

5. The circuit of claim 4 wherein said first clock signal has a frequency of approximately 921 kHz.

6. The circuit of claim 5 wherein said plurality of second divide values comprises three divide values.

7. The circuit of claim 6 wherein said second divide values comprise 95, 96, and 97 respectively.

8. The circuit of claim 6 wherein said second divide values comprise 127, 128 and 129 respectively.

9. The circuit of claim 1 further including analog to digital converting means coupled to said fourth data signal for converting said fourth data signal to a digital value.

10. The circuit of claim 1 wherein said control means comprises a digital signal processor (DSP), said DSP tracking a baud rate of said data signal and outputting control signal to said second clock dividing means in response to changes in said baud rate.

11. A circuit for providing an anti alias gain stage comprising:

first filter means coupled to a data signal and to a first clock signal, said first filter means providing a second data signal;

second filter means coupled to said second data signal and to a second clock signal, said second filter means being an anti-aliasing filter (AAF), said AAF providing a third data signal;

first clock dividing means coupled to said second clock signal for selectively dividing said second clock signal by one of a plurality of first divide values, said first dividing means providing a third clock signal asynchronous with said first clock signal;

control means coupled to said first clock dividing means for selecting one of said plurality of first divide values dependent on an amount of jitter in said first data signal.

12. The circuit of claim 11 wherein said first filter means comprises a band pass filter (BBF).

13. The circuit of claim 12 wherein said AAF comprises a switched capacitor anti alias filter.

14. The circuit of claim 13 wherein said first clock signal has an integer relationship to said second clock signal.

15. The circuit of claim 14 wherein said second clock signal has an integer relationship with said third clock signal.

16. The circuit of claim 15 further including gain stage means coupled to said third data signal, said gain stage means for amplifying said third data signal and outputting a fourth data signal.

17. The circuit of claim 16 wherein said control means comprises a digital signal processor (DSP), said DSP tracking a baud rate of said first data signal and outputting a control signal to said first clock dividing means in response to changes in said baud rate.

* * * * *